(No Model.)

J. L. JÖNSSON.
APPARATUS FOR HEATING AND STIRRING MILK, &c.

No. 555,451. Patented Feb. 25, 1896.

Witnesses.

Inventor.

Attorney.

UNITED STATES PATENT OFFICE.

JOHAN LUDVIG JÖNSSON, OF STOCKHOLM, SWEDEN.

APPARATUS FOR HEATING AND STIRRING MILK, &c.

SPECIFICATION forming part of Letters Patent No. 555,451, dated February 25, 1896.

Application filed December 31, 1895. Serial No. 573,874. (No model.) Patented in Sweden December 13, 1894, No. 5,699.

*To all whom it may concern:*

Be it known that I, JOHAN LUDVIG JÖNSSON, engineer, a subject of the King of Sweden and Norway, residing at Stockholm, Sweden, have invented certain new and useful Improvements in Heating and Stirring Apparatus for Milk and other Liquids by Means of a Steam-Turbine, (for which I have obtained a patent in Sweden December 13, 1894, No. 5,699;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In apparatus of the class to which my improvement belongs there are provided a vessel to hold the liquid and stirrers to keep said liquid in motion.

My invention has for its object to use a steam-turbine to revolve these stirrers, and so place and connect the turbine that the steam passing from said turbine will pass into a jacket surrounding the vessel and heat the liquid in the vessel.

I will first describe the embodiment of my invention illustrated in the accompanying drawings, and then specifically point out the invention in the claims.

Figure 1:
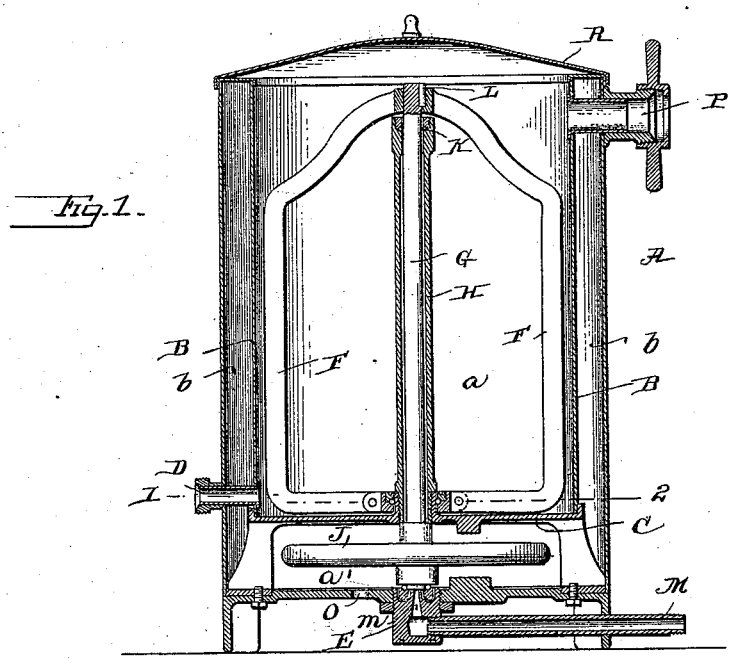
Figure 2:
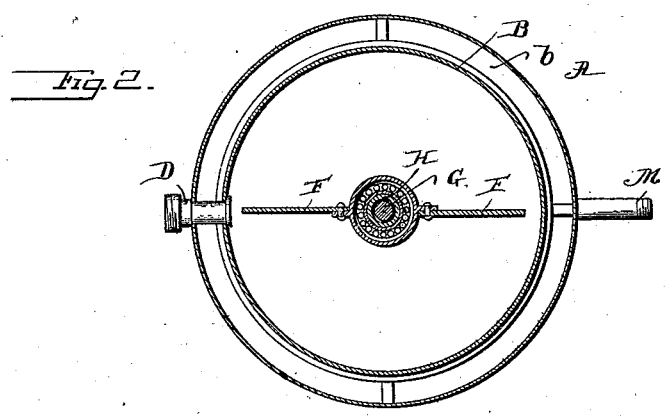

In the drawings, Figure 1 is a vertical section. Fig. 2 is a section on line 1 2, Fig. 1.

A is a vessel separated or divided into an upper and lower chamber, $a$ and $a'$, by the division C. The upper chamber has the division B surrounding it and forming a jacket $b$, while the jacket terminates in and directly connects with the lower chamber.

D is an inlet to the upper chamber $a$, and P an outlet from the same. The milk to be heated or pasteurized is fed into the chamber $a$.

F are the regular stirrers. The upper part of the stirrer is, by means of a key L, (see Fig. 1,) fastened to the shaft G.

H is a casing surrounding the shaft, and between the upper end of which and the shaft are the ball-bearings K. The lower end of casing H is threaded into a flanged projection of division C. Between this flange and the stirrer F is a ball-bearing for the stirrer F, the balls pressing against the division C. The shaft has a proper support-bearing E.

J is the turbine in the chamber $a'$ and in shaft G. M is the steam-induction pipe for said turbine, having the inlet $m$ through the bottom of the support-bearing E. O is the discharge-orifice from said chamber $a'$.

When the milk has been fed into the vessel $a$ to the desired height, steam is admitted to the turbine, which causes the shaft G to be revolved, and with it the stirrer F. The steam escaping from the turbine passes to the jacket $b$, heating the milk, and the water of condensation is carried off through orifice O. The vessel when in operation is hermetically sealed by the cover R. When the pasteurizing or heating of the milk has been concluded, the turbine is stopped and the milk drawn off.

I do not intend to limit myself to the case where the turbine is directly upon the shaft of the stirrer, as it may be indirectly connected with said shaft, my invention consisting in doing the stirring by a steam-turbine and directly connecting the exhaust of said turbine with the jacket surrounding the vessel containing the liquid to be heated.

Having now fully described my invention, what I claim, and desire to protect by Letters Patent, is—

1. The combination of a vessel surrounded by a jacket, a stirrer within said vessel, a steam-turbine, and connection between said turbine and stirrer whereby said stirrer is driven by said turbine, and a connection between the exhaust of said turbine and said jacket.

2. In combination, a vessel surrounded by a jacket, a stirrer within said vessel, a chamber beneath said vessel, a turbine within said chamber, there being a steam-inlet to said turbine, the steam from said turbine exhausting into said chamber, and connection between said chamber and the jacket.

3. The combination of a vessel surrounded by a jacket, a stirrer within said vessel, a steam-turbine, and connection between said turbine and stirrer whereby said stirrer is driven by said turbine, and a connection between the exhaust of said turbine and said jacket, the stirrer being adapted to be revolved by said turbine.

4. The combination of a vessel surrounded by a jacket, a stirrer within said vessel, a steam-turbine, and connection between said turbine and stirrer whereby said stirrer is driven by said turbine, and a connection between the exhaust of said turbine and said jacket, there being a discharge-opening from said turbine-chamber.

5. In an apparatus for heating and stirring milk and other liquids, which consists of a vessel, surrounded by a jacket and provided with stirrers, a shaft supporting the stirrer, a chamber beneath said vessel, a steam-turbine in said chamber, connection between said turbine and said shaft whereby said shaft is driven by said turbine, there being connection between said chamber and said jacket surrounding the vessel, in order to use the steam as well for heating of the liquid as for driving of the stirrer.

In testimony whereof I affix my signature in presence of two witnesses.

JOHAN LUDVIG JÖNSSON.

Witnesses:
CARL P. GERELL,
TH. WAWRINSKY.